Jan. 4, 1927.
S. FUCHS
1,613,319
WINDOW CLEANER
Filed Feb. 25, 1925
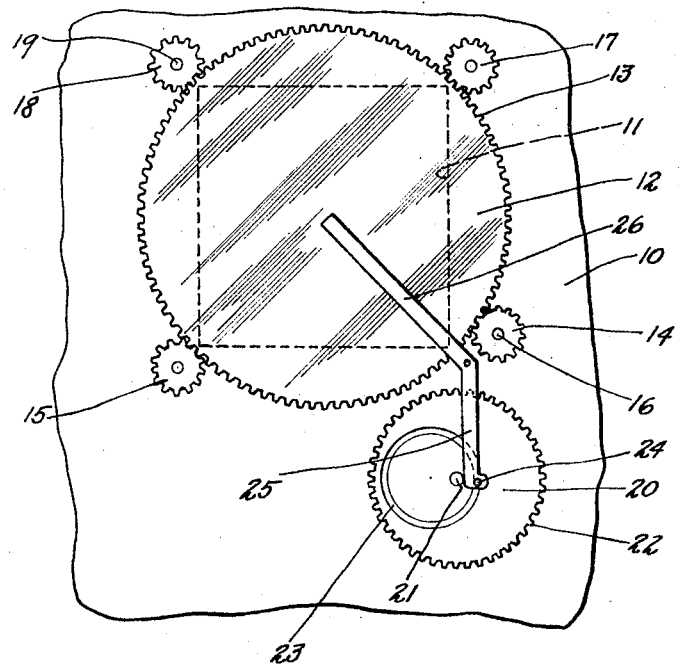
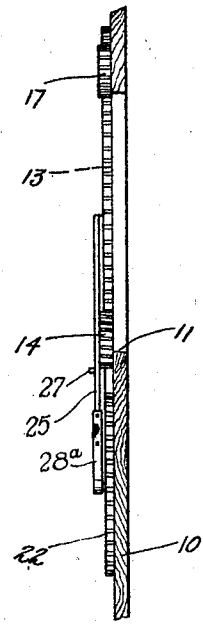
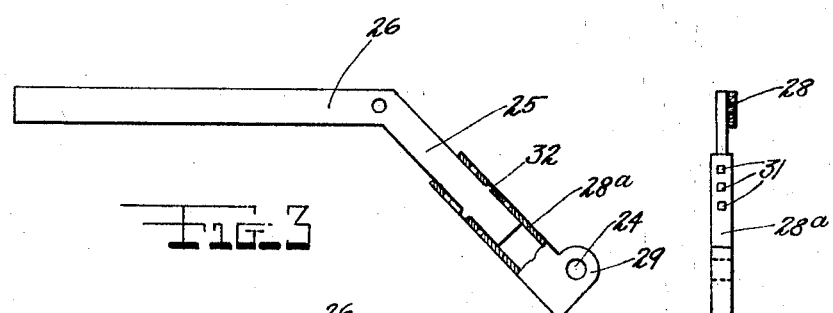
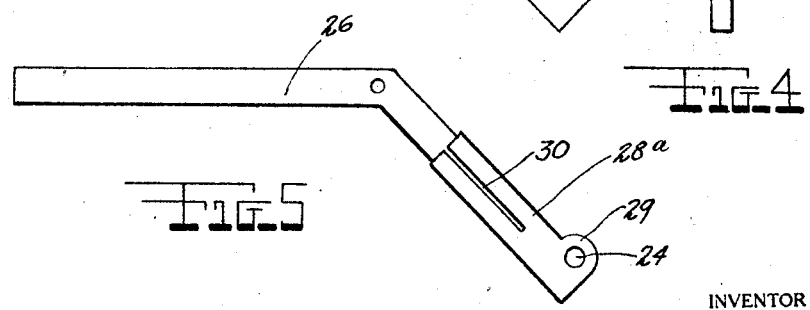
INVENTOR
S. Fuchs
BY
ATTORNEY Patented Jan. 4, 1927.

1,613,319

UNITED STATES PATENT OFFICE.

SIEGFRIED FUCHS, OF BROOKLYN, NEW YORK.

WINDOW CLEANER.

Application filed February 25, 1925. Serial No. 11,426.

The main object of this invention is to provide a novel type of window which may be used upon wind shields, store windows, or the window frames of apartment houses, and can be used to any number which are individually provided with a cleaning device upon the inner face.

Another object is to provide an automatic self-cleaning device for rotating circular windows and uses a continually oscillating wiper which describes an arcuate path over the inner surface of the window pane and cleans the same of all moisture and dust particles.

The above and other objects will become apparent in the description below, in which characters of reference refer to like-named parts in the drawing.

Referring briefly to the drawing, Figure 1 is a front elevational view of the automatic self-cleaning window.

Figure 2 is a side elevational view of the same.

Figure 3 is a front elevational view of the modified type of wiper arm, showing the means of extending the actuating lever of said arm.

Figure 4 is an end elevational view of Figure 3.

Figure 5 is a front elevational view of the wiper arm, similar to the view shown in Figure 3.

Referring in detail to the drawing, the numeral 10 indicates an opaque wall which forms part of a window frame and is provided with a square opening 11 which is covered on the inside by the transparent window 12. This transparent window is circular in outline and its entire periphery is provided with teeth 13. The window is supported upon a pair of pinions 14 and 15 which rotate upon studs 16, and similar idler pinions 17 and 18 rotatable on studs 19, are provided at the top of the window and serve to guide the movement of the window in a circular path. One of the pinions 14, 15, 17, and 18, is adapted to be driven by any desirable means not shown on the drawing, in order to rotate the window 12. These pinion gears, in order not to fracture the teeth 13 of the window, are preferably formed of leather, rubber, or some other similar soft material which offers the least vibration to the movement of the gears. A relatively large disk 20 is rotatably mounted on a shaft 21 and has teeth 22 formed on its periphery which are engaged by a source of power not shown. On one face of the disk 20, a circular channel 23 is formed eccentric with respect to the axis of rotation of the disk 20 and receives a stud 24 which rides in the channel and is mounted upon an extension 25 of a normally angular wiper arm 26 which is pivoted on a pin 27 at a position near one end. This wiper arm has one of its faces covered thruout the greater portion of its length by a rubber cushion 28 which is adapted to lie in contact with the surface of the window glass 12. A modified type of wiper arm is shown in Figures 3, 4, and 5, in which means are provided for extending one end of the arm so that the length of the portion 26 of the arm may be varied to a greater or lesser degree. The angular extension 25 forming part of the wiper arm 26 is shortened in the modified type of device and telescopes into a longitudinal shell member 28ª which has a bulge 29 at its lower end in which the stud 24 is mounted, the stud as previously stated, being adapted to ride in the eccentric channel 23. This telescoping channel is slitted at 30 thruout the major portion of its length and is provided with a plurality of square aligned openings 31, one row being on one side and an additional row on the opposite side of the shell. On both sides of the extension 25 of the wiper arm, a pair of relatively small semicircular lugs 32 are formed, and these lugs are adapted to project from the sides of the extension 25 and enter into any of the sets of openings on both sides of the shell 28 to lock the shell and extension 25 in various positions with respect to the length of both members.

In use, the window 12 is constantly rotated thru rotation of one of the pinions. The disk 20, by being engaged by a source of power is also constantly rotated. As the extension 25 of the wiper arm has the stud 24 mounted thereon, riding in the eccentric channel 23 on the disk 20, said wiper arm 26 describes an arcuate path across the inner face of the annular window 12 and wipes or cleans a triangular portion of this surface with each rotation of the disk 20. As the window is rotated toward the wiper arm 26 and the wiper arm being of a length which describes an arc from the axis of the window to its edge, the entire window will be cleaned when the window has made several revolutions. The modified type of wiper arm may be used with the device illustrated in Figures 1 and 2, and operates in the following manner. The wiper is mounted, as shown in Figure 1, and scribes an arcuate path around the pin 27 as a pivot and may have its extension elongated or shortened according to the length of the wiper arm 26 desired. The shell extension 28, into which member 25 telescopes has its walls made resilient by slitting the same on both sides, as indicated by the numeral 30. When inserting member 25 into the resilient shell 28, the lugs engage the internal wall of the shell and spread the same apart or away from each other until the lugs 32 enter into the openings and thereby lock both members 25 and 28 together.

I claim:—

Means for cleaning a portion of the area of a rotating window during a single rotation of the window glass, comprising a toothed disk rotatable below said window, a wiper arm pivoted above said disk and below said window, said arm extending angularly toward the axis of the window glass, a circular channel formed eccentrically on the face of said disk, a stud projecting from one end of said wiper arm riding in said channel, and means for varying the length of said wiper arm.

In testimony whereof I affix my signature.

SIEGFRIED FUCHS.